US010832507B2

(12) United States Patent
Kolb et al.

(10) Patent No.: US 10,832,507 B2
(45) Date of Patent: Nov. 10, 2020

(54) ELECTRONIC LOCKING SYSTEM FOR USE WITH MOBILE END DEVICE

(71) Applicant: ABUS August Bremicker Soehne KG, Wetter-Volmarstein (DE)

(72) Inventors: Marcus Kolb, Girod (DE); Marvin Mueller, Salz (DE); Markus Theis, Herbon (DE)

(73) Assignee: ABUS August Bremicker Soehne KG, Wetter-Volmarstein (DE)

( * ) Notice: Subject to any disclaimer, the term of this patent is extended or adjusted under 35 U.S.C. 154(b) by 0 days.

(21) Appl. No.: 16/406,587

(22) Filed: May 8, 2019

(65) Prior Publication Data

US 2019/0347884 A1    Nov. 14, 2019

(30) Foreign Application Priority Data

May 11, 2018 (DE) .......................... 10 2018 111 290

(51) Int. Cl.
*G07C 9/00* (2020.01)
*E05B 47/00* (2006.01)
(Continued)

(52) U.S. Cl.
CPC .......... *G07C 9/00571* (2013.01); *B60R 25/24* (2013.01); *E05B 47/0003* (2013.01); *G07C 9/00309* (2013.01); *G07C 9/00896* (2013.01); *G07C 9/28* (2020.01); *G07C 2009/00769* (2013.01)

(58) Field of Classification Search
CPC ............ G07C 9/00309; G07C 9/00571; G07C 2009/00412
See application file for complete search history.

(56) References Cited

U.S. PATENT DOCUMENTS 9,875,589 B1 * 1/2018 Buttolo .................. G08G 1/202
2011/0081860 A1   4/2011 Brown et al.
(Continued)

FOREIGN PATENT DOCUMENTS

WO    2005/017840 A1    2/2005
WO    2013/078561 A1    6/2013

OTHER PUBLICATIONS

German Search Report dated Feb. 27, 2019 in corresponding German patent application No. 10 2018 111 290.4 (ten pages).
(Continued)

*Primary Examiner* — Daniell L Negron
(74) *Attorney, Agent, or Firm* — Kilpatrick Townsend & Stockton LLP

(57) ABSTRACT

The invention relates to a locking system comprising an electrically actuable mobile lock and an activation means that comprises a virtual key associated with the lock and that serves, on an interaction with a first mobile end device, to transfer the virtual key to the first mobile end device and to store it therein, with the virtual key serving to establish an encrypted data communication connection between the first mobile end device and the lock to couple the first mobile end device to the lock and to authorize the first mobile end device to actuate the lock. The invention further deals with a method of coupling a mobile end device to an electrically actuable mobile lock for the purpose of actuating the lock by means of the mobile end device.

13 Claims, 1 Drawing Sheet

(51) Int. Cl.
*B60R 25/24* (2013.01)
*G07C 9/28* (2020.01)

(56) References Cited

U.S. PATENT DOCUMENTS

| | | |
|---|---|---|
| 2014/0169564 A1 | 6/2014 | Gautama et al. |
| 2014/0220897 A1 | 8/2014 | Wan |
| 2015/0139423 A1 | 5/2015 | Hildebrandt et al. |
| 2016/0035163 A1 | 2/2016 | Conrad et al. |
| 2016/0291966 A1 | 10/2016 | Johnson |
| 2017/0134382 A1* | 5/2017 | Darnell .................. H04L 67/12 |
| 2017/0330402 A1* | 11/2017 | Menard .............. G07C 9/00309 |

OTHER PUBLICATIONS

Extended European Search Report dated Sep. 11, 2019 in corresponding European Application No. 19172786.6.

* cited by examiner

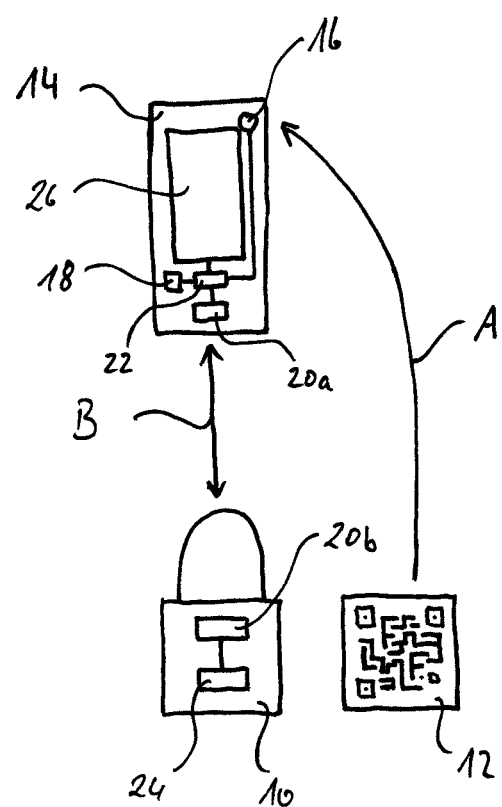

ELECTRONIC LOCKING SYSTEM FOR USE WITH MOBILE END DEVICE

This application claims priority to German Patent Application No. 102018111290.4, filed May 11, 2018, the disclosure of which is incorporated by reference herein.

The present invention relates to a locking system having an electrically actuable mobile lock and having a virtual key that is associated with the lock and that enables an actuation, i.e. an opening or locking, of the lock by means of a mobile end device such as a smartphone.

A coupling of the mobile end device and of the lock is necessary so that the lock can be actuated by means of the mobile end device such that communication or an exchange of data is possible between the mobile end device and the lock. To protect the lock from access by an unauthorized person, it is necessary that the exchange of data and in particular the coupling of the mobile end device and the lock is ensured.

It is therefore an object of the invention to provide a locking system that enables an access-protected coupling of the mobile end device and the lock.

The object is satisfied by a locking system and by a method having the features of the respective independent claim. The locking system in accordance with the invention comprises an electrically actuable mobile lock and an activation means that comprises a virtual key associated with the lock and that serves, on an interaction with a first mobile end device, to transfer the virtual key to the first mobile end device and to store it therein, with the virtual key serving to establish an encrypted data communication connection between the first mobile end device and the lock to couple the first mobile end device to the lock and to thereby authorize the first mobile end device to actuate the lock.

The method in accordance with the invention serves for the coupling of a mobile end device to an electrically actuable mobile lock for the purpose of actuating the lock by means of the mobile end device and comprises the following steps:

providing an electrically actuable mobile lock together with an activation means that comprises a virtual key associated with the lock;

transferring the virtual key to the mobile end device and storing the virtual key in the mobile end device as the result of an interaction of the mobile end device with the activation means;

establishing encrypted data communication between the mobile end device and the lock while using the virtual key; and coupling the mobile end device to the lock and thereby authorizing the mobile end device to actuate the lock.

It is the underlying general idea of the invention that a coupling that is as secure as possible between a mobile end device and a mobile lock can be achieved by an activation means that comprises a virtual key associated with the lock and that serves, on an interaction with the mobile end device, to transfer the virtual key to the mobile end device where the virtual key is stored. On a subsequent coupling of the mobile end device and the lock, the virtual key serves to establish an encrypted data communication connection between the mobile end device and the lock so that the mobile end device is authorized to actuate the lock after a successful coupling with the lock.

The advantage results from the encrypted data communication connection between the mobile end device and the lock that the exchange of data between the mobile end device and the lock is already protected against access by an unauthorized person during their coupling. An actuation process can furthermore also be protected from unauthorized access by the encrypted data communication connection. An actuation of the lock is here to be understood as any possible kind of operation of the lock by the mobile end device. The actuation of the lock is in particular an opening or a locking thereof. The mobile end device in this process so-to-say exercises the function of a conventional key.

In addition to access-protected data communication, the locking system in accordance with the invention or the method in accordance with the invention also provides the advantage that the encrypted data communication connection between the mobile end device and the lock and thus also the coupling of the mobile end device and the lock can be established in a particularly simple manner since only an interaction, in particular a single interaction, of the mobile end device with the activation means is necessary to transfer the key to the mobile end device. The downloading of implementation software, e.g. an app, to the mobile end device that automatically carries out all the further steps, i.e. the establishing of the data communication connection, the coupling of the mobile end devide and the lock, and the actuation authorization of the mobile end device can in particular be initiated by the interaction.

A mobile lock can be any desired lock that can be taken along by a user such as a hoop lock or a padlock. However, a mobile lock is also to be understood as a lock attached or attachable to a vehicle, in particular to a two-wheeled vehicle, such as a frame lock, a brake disk lock, a battery compartment lock, and the like.

In general, the mobile end device cannot only be a smartphone, but rather also a tablet computer, a smart watch, or the like.

Advantageous embodiments of the invention can be seen from the dependent claims, from the description and from the enclosed drawings.

The communication between the mobile end device and the lock preferably takes place by means of a wireless communication data connection. It is of advantage here if the mobile end device and the lock each have a transmission/reception unit for transmitting data by means of the wireless communication data connection. Bluetooth can, for example, be considered as the data transmission standard.

The interaction, in particular the first-time interaction, of the mobile end device with the activation means can effect a granting of administration rights to the first mobile end device. The administration rights can here inter alia comprise the authorization to transfer the virtual key from the first mobile end device to a further, second mobile end device. The second mobile end device can, for example, be associated with a person familiar to the user of the first mobile end device such as a family member or a girlfriend or boyfriend.

It is understood that the virtual key cannot only be transferred from the first mobile end device to a further mobile end device (second mobile end device), but also to a plurality of further mobile end devices (second mobile end devices). The virtual key is so-to-say virtually reproduced every time it is transferred.

In general, in addition to the virtual key, administration rights or partial authorizations can be transferred from the first mobile end device to the second mobile end device. It is understood that a user whose mobile end device is provided with administration rights can remove the administration rights and/or the partial authorizations from the further mobile end device again.

In order also to couple the second mobile end device to the lock in a secured manner, a transfer of the virtual key to the second mobile end device can enable the establishing of an encrypted data communication connection between the second mobile end device and the lock, whereby the second mobile end device is coupled to the lock and is authorized to actuate the lock. In this respect, the establishing of the encrypted data communication connection can take place immediately after the transfer of the virtual key or when a user having the second mobile end device approaches the lock.

If a user has lost his mobile end device already authorized to actuate the lock, e.g. the first mobile end device, or if this mobile end device had been illegally taken, the interaction of a third mobile end device with the actuation means can effect a new granting of administration rights to the third mobile end device. The third mobile end device replacing the first mobile end device is advantageously authorized by the newly granted administration rights to remove previously granted administration rights and/or previously granted authorizations to actuate the mobile lock so that from now on the lock can no longer be actuated by means of the lost or taken first mobile end device. The newly granted administration rights can also provide authorization to remove virtual keys and/or administration rights and/or partial authorizations transferred to further second mobile end devices. The removal of virtual keys and/or administration rights and/or partial authorizations can take place automatically or at the instigation of the user of the third mobile end device.

The encrypted data communication connection is produced in that the data are encrypted by one of the two communication partners, e.g. the mobile end device or the lock, and are decrypted by the other communication partner, e.g. the lock or the mobile end device. It is of advantage for this purpose if both communication partners each have the same key. The virtual key associated with the lock is transferred to the mobile end device and is saved or stored in a protected memory there by the interaction of the mobile end device with the activation means. The lock can likewise comprise a memory in which a copy of the virtual key is stored. Both the mobile end device and the lock can thus encrypt or decrypt respectively transferred data, whereby encrypted communication between the mobile end device and the lock is possible.

Alternatively or additionally, an identifier respectively associated with the or each mobile end device can be stored in the memory of the lock, whereby the lock can identify an authorized mobile end device. The lock can associate a separate identification number with each mobile end device as the identifier. The MAC address (media access control address) of the mobile end device is advantageously used as the identifier. Which mobile end device has administration rights can furthermore be noted in the memory.

So that a user having administration rights always has an idea of granted authorizations, it is advantageous for the administration rights to comprise the reading of the memory of the lock. The data stored in the memory can then be displayed on a display unit of the mobile end device, for example.

The activation means can comprise a code, in particular a code that can be evaluated by the mobile end device. The code can, for example, be an alphanumeric code that can be input into the mobile end device. It is, however, also conceivable that the code is a one-dimensional or two-dimensional code that can be read from the mobile end device, e.g. a barcode or a QR code. It is of advantage here if the interaction of the mobile end device with the activation means takes place by means of an optical unit, in particular a camera, provided at the mobile end device. The code can then in particular be scanned or photographed in a simple manner, whereby the interaction of the mobile end device with the activation means takes place and the key is transferred to the mobile end device.

The activation means is advantageously included with the lock on delivery and is first inaccessible so that an unauthorized person cannot effect an interaction with the activation means using his mobile end device. If the activation means comprises a code, for example, it can be stored invisibly from the outside in the interior of a packaging of the lock. After the opening of the packaging, an interaction of the mobile end device of the authorized user with the activation means is then possible, with the activation means being able to be safely stored at home for a repeat interaction.

If a user does not have a mobile end device, a manual transmitter that has already been coupled to the lock ex works can generally be provided to actuate the lock.

The invention will be described in the following purely by way of example with reference to a possible embodiment and to the only drawing.

FIG. 1 shows a schematic representation of the locking system in accordance with the invention.

FIG. 1 shows a locking system having an electrically actuable mobile lock 10, an activation means 12, and a mobile end device 14. In the embodiment shown in FIG. 1, the mobile lock 10 is configured in the form of a hoop lock, the activation means 12 as a two-dimensional code, and the mobile end device 14 as a smartphone.

The mobile end device 14 comprises an optical unit 16 in the form of a camera by means of which the mobile end device 14 can interact with the activation means 12 in that the two-dimensional code is scanned or photographed. It is understood that an interaction of the mobile end device 14 with the activation means 12 can take place in that the activation means 12 is an alphanumeric code that is input into the mobile end device 14.

The activation means 12 includes a virtual key that is associated with the lock 10. The virtual key is transferred to the mobile end device 14 (arrow A) and is stored there in a memory 18 of the mobile end device 14 on the interaction of the mobile end device 14 with the activation means 12.

The virtual key transferred to the mobile end device 14 serves to establish encrypted data communication between the mobile end device 14 and the lock 10 (arrow B) to couple the mobile end device 14 to the lock 10 and to authorize the mobile end device 14 to actuate, i.e. to open or to lock the lock 10. The data communication between the mobile end device 14 and the lock 10 here takes place by means of a wireless communication data connection. For this purpose, the mobile end device 14 and the lock 10 each have a transmission/reception unit 20a and 20b respectively.

The transmission/reception unit 20a of the mobile end device 14 and the optical unit 16 and the memory 18 of the mobile end device 14 are each connected in a technical data manner to a control unit 22 of the mobile end device 14.

So that encrypted data communication is possible between the mobile end device 14 and the lock 10, the lock 10 comprises a memory 24 in which a copy of the virtual key is stored. The data can hereby be encrypted by the one of the two communication partners, e.g. by the mobile end device 14 or the lock 10, and can be decrypted by the respective other communication partner, e.g. the lock 10 or the mobile end device 14.

An interaction of the mobile end device 14 does not only have the effect that the virtual key is transferred to the mobile end device 14, whereby the mobile end device 14 ultimately receives an authorization to actuate the lock 10, but also that administration rights are granted to the mobile end device 14.

The administration rights enable the user of the mobile end device 14 to transfer the virtual key from the mobile end device 14 (first mobile end device) to at least one further mobile end device (second mobile end device) not shown in FIG. 1. If the virtual key has been transferred from the first mobile end device 14 to the further, second mobile end device, the virtual key transferred to the second end device also makes it possible to establish an encrypted data communication connection between the second mobile end device and the lock 10 to couple the second mobile end device to the lock 10 and to authorize the second mobile end device for the actuation of the lock 10. In general, administration rights could also be transferred from the first mobile end device 14 to the second mobile end device.

So that the lock 10 recognizes whether a mobile end device 14 is actually an authorized mobile end device 14, not only the copy of the virtual key can be stored in the memory 24 of the lock 10, but also an identifier respectively associated with the or each mobile end device. In addition, which mobile end device has which administration rights can also be stored in the memory 24 of the lock 10. It must be noted at this point that the administration rights provide authorization to read the contents of the memory 24 of the lock 10. The read contents of the memory 24 of the lock 10 can then be displayed by means of a display unit 26 of the mobile end device 14. The display unit 26 is likewise connected to the control unit 22 of the mobile end device 14 in a technical data manner.

If the user of the first mobile end device 14 loses it or if it has been illegally removed, there is the option of carrying out a repeat interaction with the activation means using a third mobile end device that is not shown in FIG. 1 and that replaces the first mobile end device 14. The interaction of the third mobile end device with the activation means effects a new granting of administration rights to the third mobile end device, whereby previously granted administration rights and/or authorizations for the actuation of the lock 10 granted to other end devices can be removed gain.

The procedure of the method for coupling a mobile end device 14 to the mobile lock 10 will be described in the following.

The method starts in that an electrically actuable mobile lock 10 is provided together with an activation means 12, with the activation means 12 comprising a virtual key associated with the lock 10. On an interaction of a mobile end device 14 with the activation means 12, a virtual key is transferred to the mobile end device 14. An encrypted data connection is subsequently established between the mobile end device 14 and the lock 10 using the virtual key. In this respect, the virtual key stored by a mobile end device 14 is compared with the copy of the virtual key stored in the memory 24 of the lock 10. If the virtual key of the mobile end device 14 and the copy of the virtual key stored in the memory 24 of the lock 10 coincide, the mobile end device 14 and the lock 10 are coupled and as a result the mobile end device 14 is authorized for the actuation of the lock 10.

So that the lock 10 only recognizes mobile end devices 14 authorized for the actuation thereof, the identifier identifying the mobile end device 14 is recorded in the memory 24 of the lock 10 on a coincidence of the two virtual keys. On a recognition of the mobile end device 14 by means of the identifier associated with the mobile end device 14, the lock 10 can thus respond accordingly to an actuation query of the mobile end device 14 by an opening or locking procedure.

REFERENCE NUMERAL LIST 10 lock
12 activation means
14 mobile end device
16 optical unit
18 memory
20 transmission/reception unit
22 control unit
24 memory
26 display unit
A arrow
B arrow

The invention claimed is:

1. A locking system comprising:
an electrically actuable mobile lock; and
an activation means that comprises a virtual key associated with the lock,
wherein a first mobile end device and a third mobile end device are configured to perform an interaction with the activation means,
wherein performing the interaction with the first mobile end device causes the virtual key to be transferred to the first mobile end device and to be stored therein,
wherein transferring the virtual key to the first mobile end device enables establishing an encrypted data communication connection between the first mobile end device and the lock in order to couple the first mobile end device to the lock and to thereby authorize the first mobile end device to actuate the lock;
wherein the interaction of the first mobile end device with the activation means grants administration rights to the first mobile end device,
wherein in response to performing the interaction with the third mobile end device and the activation means, subsequent to performing the interaction with the first mobile end device, administration rights are granted to the third mobile end device, and at least one of:
the administration rights granted to the first mobile end device are removed; and
authorizations to actuate the lock granted to a second mobile end device are removed.

2. The locking system in accordance with claim 1, wherein the interaction with the first mobile end device is a first-time interaction.

3. The locking system in accordance with claim 1, wherein the administration rights of the first mobile end device authorize a transfer of the virtual key stored in the first mobile end device to the second mobile end device.

4. The locking system in accordance with claim 3, wherein, after the transfer to the second mobile end device, the virtual key enables an encrypted data communication connection between the second mobile end device and the lock to couple the second mobile end device to the lock and to authorize the second mobile end device to actuate the lock.

5. The locking system in accordance with claim 1, wherein the lock has a memory in which a copy of the virtual key is stored and/or in which an identifier respectively associated with a or each mobile end device is stored and/or in which said mobile end device has administration rights is stored.

6. The locking system in accordance with claim 1, wherein the lock has a memory in which a copy of the virtual key is stored and/or in which an identifier respectively associated with a or each mobile end device is stored and/or in which said mobile end device has administration rights is stored and the administration rights comprise the reading of the memory of the lock.

7. The locking system in accordance with claim 1, wherein the activation means comprises a code.

8. The locking system in accordance with claim 1, wherein the interaction of at least one of the first and third mobile end device with the activation means takes place by means of an optical unit provided at the at least one of the first and third mobile end device.

9. The locking system in accordance with claim 8, wherein the optical unit is a camera.

10. The locking system in accordance with claim 1, wherein the newly granted administration rights to the third mobile end device authorize previously granted administration rights to the first mobile end device to be removed.

11. The locking system in accordance with claim 1, wherein the newly granted administration rights to the third mobile end device authorize authorizations to a second mobile end device to be removed.

12. A method of coupling mobile end devices to an electrically actuable mobile lock for the purpose of actuating the lock by means of the mobile end devices, said method comprising the following steps:
 providing an electrically actuable mobile lock together with an activation means that comprises a virtual key associated with the lock;
 performing an interaction with a first mobile end device and the activation means;
 transferring the virtual key to the first mobile end device and storing the virtual key in the first mobile end device in response to performing the interaction with the first mobile end device and the activation means;
 establishing encrypted data communication between the first mobile end device and the lock while using the virtual key; and
 coupling the first mobile end device to the lock and thereby authorizing the first mobile end device to actuate the lock;
 granting administration rights to the first mobile end device;
 performing the interaction with a third mobile end device and the activation means, subsequent to performing the interaction with the first mobile end device and the activation means; and
 in response to performing the interaction with the third mobile end device and the activation means, granting administration rights to the third mobile end device and at least one of:
 removing the administration rights granted to the first mobile end device; and
 removing authorizations to actuate the lock granted to a second mobile end device.

13. The method in accordance with claim 12, additionally comprising the steps of:
 comparing the virtual key stored in the mobile end device with a copy of the virtual key stored in a memory of the lock; and
 recording an identifier identifying the mobile end device in the memory of the lock on a coincidence of the virtual key associated with the mobile end device and of the copy of the virtual key stored in the memory.

* * * * *